United States Patent Office 3,429,929
Patented Feb. 25, 1969

3,429,929
PRODUCTION OF GLYOXAL
Erich Nebe, Heidelberg, Germany, assignor to Badische Anilin- & Soda-Fabrik Aktiengesellschaft, Ludwigshafen (Rhine), Germany
No Drawing. Filed Dec. 14, 1966, Ser. No. 601,543
Claims priority, application Germany, Jan. 8, 1966, B 85,330
U.S. Cl. 260—601                              4 Claims
Int. Cl. C07c 45/00, 47/12

This invention relates to a process for the production of glyoxal by the oxidation of acetaldehyde with nitric acid.

It is known that glyoxal can be prepared by the oxidation of acetaldehyde with nitric acid. Formerly, this process was carried out by adding a layer of acetaldehyde to concentrated nitric acid and allowing the reaction to proceed at the interface. According to German Patent 521,722 better results are obtained in this process by carrying out the reaction in the presence of finely divided substances. However, this "diffusional" process is not very suitable for the manufacture of glyoxal on a commercial scale.

German Patent 573,721 describes a process in which acetaldehyde or paraldehyde is oxidized with nitric acid in homogeneous solution at temperatures above 30° C. The reaction is initiated by small amounts of oxides of nitrogen. Vanadic acid, selenous acid and activated carbon are recommended as reaction promoters. The yield, based on acetaldehyde reacted, is at the most approximately 45% of the theory.

A similar process is described in U.S. Patent 2,599,335. In this process, a small amount of nitrous acid is constantly present and manganese salts are recommended as reaction promoters in addition to vanadic acid and selenous acid.

The aqueous, preferably 8 to 15 wt. percent glyoxal solutions obtained by the prior art processes contain appreciable amounts of acetic acid resulting from side reactions. They also contain glyoxylic acid and formic acid from secondary reactions. Moreover, the said solutions contain 1 to 2% by weight of nitric acid even if acetaldehyde is used in excess to repress side and secondary reactions. When the primary solutions are boiled down to commercial 4% by weight glyoxal solutions to eliminate volatile organic acids, the nitric acid builds up and reacts with the glyoxal formed, so that the content of unwanted derivatives is further increased. This reaction can become fairly vigorous so that great care should be used in concentrating the mixture to avoid decomposition.

According to a process described in Japanese Patent 311,339 the acids are separated from the aqueous glyoxal solutions by treatment with anion exchange resins. This process however requires large amounts of anion exchange resins and is therefore uneconomical. In the process of the said patent the primary solutions are first concentrated to a point where the glyoxal is not yet attacked by the nitric acid, acetaldehyde is again added and the mixture is then heated for some time, the nitric acid being used up.

It is an object of the present invention to provide a process for the manufacture of glyoxal by the oxidation of acetaldehyde with nitric acid which gives high yields, in which the nitric acid used is utilized in a high degree, and in which concentration of the dilute reaction solution does not result in the nitric acid content rising to such an extent as to give rise to side reactions and decomposition.

These and other objects are achieved by carrying out the oxidation of acetaldehyde with nitric acid in the presence of catalytic amounts of copper compounds.

The process of this invention gives higher yields of glyoxal than the methods hitherto used and the nitric acid is degraded to a greater extent than hitherto. If an excess of acetaldehyde is used, the nitric acid is practically completely used up after the excess acetaldehyde has been removed. Therefore, less or no additional organic acids are formed upon concentration of the primary solutions, nor is decomposition observed during evaporation. These advantageous effects are achieved by the use of copper, whereas the reaction promoters hitherto recommended do not produce any similar beneficial results.

Except for the use of copper the process is carried out in conventional manner, i.e., it is expedient to use 40 to 60% by weight nitric acid. The acetaldehyde can be used as such or in the form of aqueous, preferably at least 30 wt. percent aqueous solutions. Paraldehyde may be used instead of acetaldehyde. It is recommended to use the acetaldehyde in excess, 1.5 to 3 moles of acetaldehyde preferably being used per mole of nitric acid.

The process of this invention in general carried out at atmospheric pressure and at temperatures between 30 and 60° C., especially between 35 and 45° C. If necessary, the reaction may be initiated by adding a small amount of a nitrite.

The most essential feature of the process of this invention is that it is carried out in the presence of catalytic amounts of copper compounds. In general, organic or inorganic copper (I) salts or copper (II) salts are used, e.g., copper (I) chloride, copper (I) nitrate, copper (II) chloride, copper (II) nitrate, copper (II) sulfate, copper (II) carbonate, copper (II) formate, copper (II) acetate and copper (II) benzoate. Other suitable copper compounds are chelate complexes, such as copper (II) acetylacetonate. Copper (I) oxide and copper (II) oxide may also be used. It is also possible to use metallic copper, preferably in finely divided form, which is converted into copper (II) nitrate under the reaction conditions. Copper (I) compounds are also converted into copper (II) compounds under the reaction conditions. As the type of anion is not critical, it is the presence in the reaction solution of copper (II) ions in dissolved form which seems to produce the decisive effect.

The copper compound need be applied only in small amounts. In general, 0.01 to 1.0, especially 0.05 to 0.5 wt. percent (based on nitric acid, calc. as 100%), of copper in the form of copper compounds or copper (II) ions, is used.

The process may, for example, be carried out batchwise by carefully and gradually mixing the nitric acid with the acetaldehyde or paraldehyde, some nitrite being added to initiate the reaction. The copper compound may be dissolved in the nitric acid, or it may be added separately, either as such or as a solution. The temperature may be easily kept at the desired level by cooling. The acetaldehyde contained in the off-gas is advantageously scrubbed out and recycled to the reaction vessel together with the wash liquid. Any excess acetaldehyde is removed from the 8 to 15 wt. percent aqueous glyoxal solution formed. The copper contained in the remaining solution is precipitated, for example, with hydrogen sulfide, and the precipitated copper compound is filtered off. The remaining solution may then be concentrated in conventional manner. The copper compound may be dissolved in nitric acid and the solution used for a new batch.

The invention is further illustrated by, but not limited to, the following example in which the parts specified are parts by weight.

EXAMPLE 20 parts of acetaldehyde and 30 parts of 50 vol. percent nitric acid are mixed in a stirred vessel and the reaction is initiated by adding 0.1 part of sodium nitrite while stirring. After the reaction has started, 104 parts of acetaldehyde, 150 parts of 50 vol. percent nitric acid and, if desired, a catalyst are added per hour while stirring, the temperature being maintained at 40° C. by cooling. The off-gas escaping during the reaction is washed countercurrent with 100 parts per hour of ice-cooled water. The wash liquid which contains the acetaldehyde entrained by the off-gas is returned to the vessel. 520 parts of acetaldehyde and 750 parts of 50 vol. percent nitric acid are reacted in all and 500 parts of water is used for washing the off-gas. The results obtained are compiled in the following table.

The yield of glyoxal is the same if paraldehyde is used as the starting material instead of acetaldehyde, as the former is rapidly converted into acetaldehyde under the reaction conditions.

I claim:
1. A process for the manufacture of glyoxal which comprises reacting acetaldehyde or paraldehyde with

| Batch | Catalyst (based on total nitric acid, calc. as 100%) | Yield of glyoxal in approx. 10 wt. percent solution ("primary solution") still containing aldehyde | Nitric acid content of primary solution (wt. percent) | Organic acids in primary solution, calc. as acetic acid in wt. percent based on glyoxal |
|---|---|---|---|---|
| 1 | None | 54.2% of the theory | 1.4 | 93.0 |
| 2 | 0.10 wt. percent Cu as copper nitrate | 63.3% of the theory | 0.3 | 81.5 |
| 3 | 0.28 wt. percent Mn as manganese carbonate. | 55.5% of the theory | 1.3 | 91.8 |
| 4 | 0.28 wt. percent Se as selenous acid | 54.2% of the theory | 1.3 | 92.4 |
| 5 | 0.15 wt. percent V as ammonium vanadate. | 27.4% of the theory | 0.7 | 259.5 |

(The amount of organic acids is determined from the acid number and the analytically determined nitric acid concentration.)

The acetaldehyde is removed from the primary solutions by distillation at atmospheric pressure. The content of nitric acid in the remaining solution is then 1.1% by weight in batch 1, whereas no nitric acid can be detected in batch 2. By treating the solution from batch 2 with hydrogen sulfide, 0.45 part of copper sulfide is precipitated and separated and the remaining glyoxal solution is concentrated at a temperature of 80° C. and a pressure of 250 mm. Hg to an approx. 60% by weight glyoxal solution without decomposition and without any appreciable amounts of acids being formed.

Identical results are achieved by using in experiment 2, instead of copper nitrate, 0.10% by weight of copper in the form of copper (I) chloride, copper (II) chloride, copper (II) sulfate, copper (II) oxide, copper (II) hydroxide, copper (II) carbonate, copper (II) acetate, copper (II) benzoate or copper (II) acetalacetonate. The same result is also achieved by using finely divided copper (0.1% by weight based on nitric acid calculated as 100%) which slowly dissolves in the reaction mixture forming copper nitrate.

nitric acid in the presence of 0.01 to 1% by weight of copper, based on nitric acid calculated as 100%, in the form of copper compounds.

2. A process as claimed in claim 1 wherein the reaction temperature is from 30 to 60° C.

3. A process as claimed in claim 1 wherein 1.5 to 3 moles of acetaldehyde is used per mole of nitric acid.

4. A process for the manufacture of glyoxal which comprises reacting acetaldehyde with nitric acid in the presence of 0.01 to 1% by weight of copper (II) ions based on nitric acid calculated as 100%.

References Cited

UNITED STATES PATENTS 2,599,335   6/1952   Lehmann et al. _____ 260—601

BERNARD HELFIN, *Primary Examiner.*

R. H. LILES, *Assistant Examiner.*